(12) United States Patent
Jeon et al.

(10) Patent No.: US 11,046,204 B2
(45) Date of Patent: Jun. 29, 2021

(54) CHARGING SERVICE SYSTEM FOR A VEHICLE, A METHOD OF PROVIDING A CHARGING SERVICE, AND A VEHICLE USING THE SAME

(71) Applicants: HYUNDAI MOTOR COMPANY, Seoul (KR); KIA MOTORS CORPORATION, Seoul (KR)

(72) Inventors: Young Tak Jeon, Ansan-si (KR); Chang Woo Chun, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 99 days.

(21) Appl. No.: 16/598,774

(22) Filed: Oct. 10, 2019

(65) Prior Publication Data

US 2020/0317080 A1 Oct. 8, 2020

(30) Foreign Application Priority Data

Apr. 4, 2019 (KR) .................. 10-2019-0039377

(51) Int. Cl.
*B60L 53/66* (2019.01)
*H02J 7/00* (2006.01)
(Continued)

(52) U.S. Cl.
CPC ........ *B60L 53/665* (2019.02); *G01C 21/3469* (2013.01); *H02J 7/0047* (2013.01); *G06Q 50/30* (2013.01)

(58) Field of Classification Search
CPC ... B60L 53/665; G06Q 50/30; G01C 21/3469; H02J 7/0047
(Continued)

(56) References Cited

U.S. PATENT DOCUMENTS 9,326,092 B2 * 4/2016 Nelson et al. .......... H04L 67/26
10,286,798 B1 * 5/2019 Penilla et al. ........ H02J 7/0045
(Continued)

FOREIGN PATENT DOCUMENTS

JP 2010286400 A 12/2010
JP 2014003803 A 1/2014
(Continued)

*Primary Examiner* — Sun J Lin
(74) *Attorney, Agent, or Firm* — Lempia Summerfield Katz LLC

(57) ABSTRACT

A charging service system for a vehicle, a method, and a vehicle using the same provide a charging service. The charging service system includes: a charging service server configured to generate and provide a charging service solution list corresponding to a vehicle that requires charging; an audio/video/navigation/telematics (AVNT) system connected to the charging service server; and a charging-service-providing server connected to the charging service server to provide a charging service. The charging service server generates a charging service solution list; transmits the charging service solution list to the AVNT system; receives one solution item selected from the charging service solution list from the AVNT system; transmits a charging service request corresponding to the selected solution item to the charging-service-providing server; and transmits charging service progress information of the charging-service-providing server to the AVNT system.

19 Claims, 10 Drawing Sheets

(51) Int. Cl.
*G01C 21/34* (2006.01)
*G06Q 50/30* (2012.01)

(58) Field of Classification Search
USPC .......................................................... 320/109
See application file for complete search history.

(56) References Cited

U.S. PATENT DOCUMENTS

| | | | | |
|---|---|---|---|---|
| 10,841,388 | B2* | 11/2020 | Kang | ...................... H04W 4/80 |
| 2006/0206610 | A1* | 9/2006 | Ling et al. | .............. H04L 67/26 |
| | | | | 709/226 |
| 2013/0346166 | A1* | 12/2013 | Chihara | ................ B60L 53/305 |
| | | | | 705/13 |
| 2017/0167887 | A1 | 6/2017 | Choi | |
| 2017/0287237 | A1* | 10/2017 | Koenig et al. | ......... G07C 5/008 |
| 2019/0199115 | A1* | 6/2019 | Fang et al. | ............ H02J 7/0047 |
| 2019/0308513 | A1* | 10/2019 | Akhavan-Tafti | ........ B60L 53/32 |
| 2019/0381910 | A1* | 12/2019 | Akhavan-Tafti | ........ H02J 7/025 |
| 2020/0257413 | A1* | 8/2020 | Jung | ..................... G06F 3/0482 |

FOREIGN PATENT DOCUMENTS

| | | |
|---|---|---|
| KR | 20120116162 A | 10/2012 |
| KR | 20120117311 A | 10/2012 |
| KR | 20140015740 A | 2/2014 |
| KR | 20140043007 A | 4/2014 |

\* cited by examiner

FIG. 3

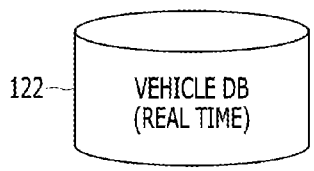

| CLASSIFICATION | INFORMATION |
|---|---|
| VEHICLE TYPE | ELECTRIC VEHICLE |
| FUEL TYPE | ELECTRIC PACK |
| VEHICLE INFORMATION | NAMYANG SAGEORI (GPS x, y, z) |
| | ROUTE SET IN NAVIGATION SYSTEM |
| | DESTINATION |
| | TRAVELABLE DISTANCE |
| | OPERATION OF ELECTRONIC COMPONENTS (AIR CONDITIONING) DEPLETING FUEL, ETC. |

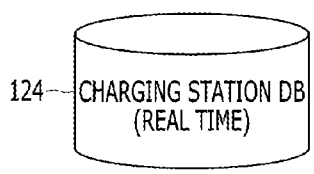

| CLASSIFICATION | INFORMATION |
|---|---|
| CHARGING STATION | LOCATION OF CHARGING STATION |
| | AVAILABILITY (UNAVAILABLE/AVAILABLE) |
| | CHARGING SERVICE USE STATUS (BUSY/NORMAL/SMOOTH) |
| | OPERATING HOURS |
| | WAITING STATUS (EXPECTED WAIT TIME) |
| | DISPATCH SERVICE WAITING STATUS (DRONE, CAR, EXPRESS DELIVERY) |
| | TYPE OF FUEL, ETC. |

FIG. 4

| CHARGING SERVICE | AVAILABILITY | USE STATUS | ARRIVAL DISTANCE | EXPECTED ARRIVAL TIME | SERVICE COST (CHARGING FEE NOT INCLUDED) |
|---|---|---|---|---|---|
| CHARGING STATION#1 | AVAILABLE | Busy | 5Km | - | - |
| CHARGING STATION#2 | AVAILABLE | NORMAL | 10Km | - | - |
| CHARGING STATION#3 | AVAILABLE | SMOOTH | 22Km | - | - |
| CHARGING STATION#4 -DRONE#1 | AVAILABLE | IMMEDIATELY AVAILABLE | 10Km | 10min | 10,000WON |
| CHARGING STATION#8 -DRONE#2 | AVAILABLE | IMMEDIATELY AVAILABLE | 2Km | 2min | 5,000WON |
| CHARGING STATION#4 -CAR#1 | AVAILABLE | IMMEDIATELY AVAILABLE | 10Km | 15min | 50,000WON |
| CHARGING STATION#5- | UNAVAILABLE | BREAKDOWN | 20Km | - | - |
| PUBLIC OFFICE#1 -DRONE#3 | AVAILABLE | IMMEDIATELY AVAILABLE | 5Km | 5min | FREE |
| ... | | | | | |

| AVAILABLE CHARGING STATION / CHARGING METHOD | USE STATUS | ARRIVAL TIME OF CHARGING VEHICLE | CHARGING TIME | COST | TRAVELABLE DISTANCE AFTER CHARGING | NOTES |
|---|---|---|---|---|---|---|
| CHARGING STATION#4 - DRONE#1 QUICK AND FULL CHARGING USING DRONE | IMMEDIATELY AVAILABLE | 5 MINUTES (DRONE TRAVEL TIME) | 15 MINUTES | 20,000 WON | 100km | |
| CHARGING STATION#4 - DRONE#2 QUICK AND PARTIAL CHARGING USING DRONE | IMMEDIATELY AVAILABLE | 5 MINUTES (DRONE TRAVEL TIME) | 5 MINUTES | 5,000 WON | 20km | |
| CHARGING STATION#8 - CAR#3 QUICK AND FULL CHARGING USING CAR | IMMEDIATELY AVAILABLE | 20 MINUTES (CHARGING CAR TRAVEL TIME) | 30 MINUTES | 20,000 WON | 300km | |
| CHARGING STATION#4 - CAR#1 QUICK AND PARTIAL CHARGING USING CAR | IMMEDIATELY AVAILABLE | 20 MINUTES (CHARGING CAR TRAVEL TIME) | 5 MINUTES | 10,000 WON | 20km | |
| CHARGING STATION#1 FULL CHARGING | 30-MINUTE WAIT | DIRECT TRAVEL NECESSARY | 30 MINUTES | 70,000 WON | 500km | |
| CHARGING STATION#1 PARTIAL CHARGING | IMMEDIATELY AVAILABLE | DIRECT TRAVEL NECESSARY | VARIES DEPENDING ON CHARGING AMOUNT | VARIES DEPENDING ON CHARGING AMOUNT | VARIES DEPENDING ON CHARGING AMOUNT | |
| PUBLIC OFFICE#1 - DRONE#2 PARTIAL CHARGING USING DRONE | IMMEDIATELY AVAILABLE | 1 HOUR | 5 MINUTES | FREE | 20km | |

FIG. 7

| AVAILABLE CHARGING STATION / CHARGING METHOD | AVAILABILITY | USE STATUS | ARRIVAL TIME OF CHARGING VEHICLE | CHARGING TIME | COST | TRAVELABLE DISTANCE AFTER CHARGING | NOTES |
|---|---|---|---|---|---|---|---|
| ... | | | | | | | |
| ULJIN AIRPORT TEMPORARY CHARGING STATION / DIRECT CHARGING | UNAVAILABLE | - | - | - | - | - | |
| ULJIN AIRPORT TEMPORARY CHARGING STATION / EMERGENCY CAR#1 (FULL, PARTIAL) | AVAILABLE | 2-HOUR WAIT | 10MINUTES | FULL : 3 HOURS QUICK : 10 MINUTES | 100,000 WON 20,000 WON | 600Km 50Km | |
| ULJIN AIRPORT TEMPORARY CHARGING STATION / EMERGENCY CAR#2 (FULL, PARTIAL) | AVAILABLE | 30-MINUTE WAIT | 5MINUTES | FULL : 3 HOURS QUICK : 10 MINUTES | 100,000 WON 20,000 WON | 600Km 50Km | |
| ULJIN AIRPORT TEMPORARY CHARGING STATION / DRONE#1 (PARTIAL) | AVAILABLE | IMMEDIATELY AVAILABLE | 5MINUTES | 5 MINUTES | 10,000 WON | 50Km | - |
| HUENEST TEMPORARY CHARGING STATION / DIRECT CHARGING | UNAVAILABLE | - | - | - | - | - | |
| HUENEST TEMPORARY CHARGING STATION / DRONE#2 (PARTIAL) | AVAILABLE | IMMEDIATELY AVAILABLE | 10MINUTES | 5 MINUTES | 10,000 WON | 50Km | * POSSIBLE TO REACH NEARBY YANGYANG-GUN OFFICE CHARGING STATION AFTER PARTIAL CHARGE |
| YANGYANG-GUN OFFICE CHARGING STATION / DIRECT CHARGING | AVAILABLE | IMMEDIATELY AVAILABLE | - | - | VARIES DEPENDING ON CHARGING AMOUNT | - | |
| ... | | | | | | | |

| AVAILABLE CHARGING STATION / CHARGING METHOD | AVAILABILITY | USE STATUS | ARRIVAL TIME OF CHARGING VEHICLE | CHARGING TIME | COST | TRAVELABLE DISTANCE AFTER CHARGING | NOTES |
|---|---|---|---|---|---|---|---|
| ULJIN AIRPORT TEMPORARY CHARGING STATION / EMERGENCY CAR#1 (FULL, PARTIAL) | AVAILABLE | 2-HOUR WAIT | 10 MINUTES | FULL : 3 HOURS / QUICK : 10 MINUTES | 100,000 WON / 20,000 WON | 600Km / 50Km | |
| ULJIN AIRPORT TEMPORARY CHARGING STATION / EMERGENCY CAR#2 (FULL, PARTIAL) | AVAILABLE | 30-MINUTE WAIT | 5 MINUTES | FULL : 3 HOURS / QUICK : 10 MINUTES | 100,000 WON / 20,000 WON | 600Km / 50Km | |
| ULJIN AIRPORT TEMPORARY CHARGING STATION / DRONE#1 (PARTIAL) | AVAILABLE | IMMEDIATELY AVAILABLE | 5 MINUTES | 5 MINUTES | 10,000 WON | 50Km | OPTIMUM (440) |
| HUENEST TEMPORARY CHARGING STATION / DRONE#2 (PARTIAL) | AVAILABLE | IMMEDIATELY AVAILABLE | 10 MINUTES | 5 MINUTES | 10,000 WON | 50Km | * POSSIBLE TO REACH NEARBY YANGYANG-GUN OFFICE CHARGING STATION AFTER PARTIAL CHARGE |
| YANGYANG-GUN OFFICE CHARGING STATION / DIRECT CHARGING | AVAILABLE | IMMEDIATELY AVAILABLE | - | - | VARIES DEPENDING ON CHARGING AMOUNT | - | - |
| ... | | | | | | | |

400

CHARGING SERVICE SYSTEM FOR A VEHICLE, A METHOD OF PROVIDING A CHARGING SERVICE, AND A VEHICLE USING THE SAME

This application claims the benefit of priority to Korean Patent Application No. 10-2019-0039377, filed on Apr. 4, 2019, which is hereby incorporated by reference as if fully set forth herein.

BACKGROUND

Field of the Disclosure

The present disclosure relates to a charging service system for a vehicle. More particularly, the present disclosure relates to a charging service system for a vehicle, which may offer an optimum emergency charging solution to a vehicle or a customer that needs an emergency charging service according to the situation, to a method of providing a charging service, and to a vehicle using the same.

Discussion of the Related Art

As the need to protect the global environment is getting more important, hybrid electric vehicles (HEVs), electric vehicles (EVs), fuel cell vehicles (FCVs), and the like have recently been developed. As a result, the development of electric vehicles is expected to become even more prominent in the future.

In order to promote electric vehicles, a charging system infrastructure for charging the batteries installed in electric vehicles needs to be established.

Currently, however, a charging system infrastructure is not well established. This may cause many problems if electric vehicles become prevalent.

In particular, when the battery of an electric vehicle is discharged while on the road, the electric vehicle needs to be towed by a tow truck or needs to be charged using an emergency charging service due to the lack of charging system infrastructure.

However, it is difficult for a conventional emergency charging service, such as a charging-car dispatch service, a charging-drone dispatch service, or an emergency road service, to satisfactorily assist customers who are in various situations.

Therefore, there is demand for the development of a charging service system for a vehicle that is capable of actively offering an optimum emergency charging solution to a vehicle or a customer that needs an emergency charging service according to the situation.

SUMMARY

Accordingly, the present disclosure is directed to a charging service system for a vehicle, a method of providing a charging service, and a vehicle using the same that substantially obviate one or more problems due to limitations and disadvantages of the related art.

An object of the present disclosure is to provide a charging service system for a vehicle, which may provide a charging service solution list. Another object of the present disclosure is to provide a charging service corresponding to a solution item selected from the charging service solution list to a customer's vehicle that requires charging. Thereby, an optimum charging service is provided according to the situation of the customer's vehicle. Other objects of the present disclosure are to provide a method of providing a charging service and a vehicle using the same.

Another object of the present disclosure is to provide a charging service system for a vehicle, which may provide charging service progress information to a customer's vehicle that requires charging, thereby providing convenience in use, a method of providing a charging service, and a vehicle using the same.

Additional advantages, objects, and features of the disclosure are set forth in part in the description which follows and in part should become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a charging service system for a vehicle is disclosed. The charging service system includes a charging service server configured to generate and provide a charging service solution list corresponding to a vehicle that requires charging. The charging service system also includes an audio/video/navigation/telematics (AVNT) system of a vehicle connected to the charging service server, where the AVNT system displays the charging service solution list. The charging service system further includes a charging-service-providing server connected to the charging service server. The charging-service-providing server provides a charging service corresponding to the vehicle that requires charging. The charging service server generates a charging service solution list corresponding to the vehicle that requires charging. The charging service server further transmits the charging service solution list to the AVNT system of the vehicle. The charging service server also receives one solution item selected from the charging service solution list from the AVNT system of the vehicle. The charging service server further transmits a charging service request corresponding to the selected solution item to the charging-service-providing server. The charging service server also transmits charging service progress information of the charging-service-providing server to the AVNT system of the vehicle.

In another aspect of the present disclosure, a method of providing a charging service of a charging service system for a vehicle, which includes a charging service server connected to an AVNT system of the vehicle and to a charging-service-providing server, is performed. The charging service server receives vehicle information from the AVNT system of the vehicle and receives charging service provider information from the charging-service-providing server. The charging service server generates a charging service solution list based on the received vehicle information and the received charging service provider information. The charging service server transmits the generated charging service solution list to the AVNT system of the vehicle. The charging service server receives one solution item selected from the charging service solution list from the AVNT system of the vehicle. The charging service server transmits a charging service request corresponding to the selected solution item to the charging-service-providing server. The charging service server receives charging service progress information from the charging-service-providing server. The charging service server transmits the received charging service progress information to the AVNT system of the vehicle.

In still another aspect of the present disclosure, a computer-readable recording medium having recorded thereon a program for executing a method of providing a charging service of a charging service system for a vehicle performs operations included in the method of providing a charging service of the charging service system for the vehicle.

In still another aspect of the present disclosure, a vehicle uses a charging service system for the vehicle. The vehicle further includes a charging service server connected to an AVNT system of the vehicle and to a charging-service-providing server. The vehicle also includes a communication device, which is connected to the charging service server and the AVNT system. The AVNT system displays a charging service solution list and charging service progress information received from the charging service server. Upon receiving the charging service solution list from the charging service server, the AVNT system displays the received charging service solution list. When one solution item is selected from the displayed charging service solution list, the AVNT system transmits the selected solution item to the charging service server. Upon receiving the charging service progress information corresponding to the selected solution item from the charging service server, the AVNT system displays the received charging service progress information.

It is to be understood that both the foregoing general description and the following detailed description of the present disclosure include examples and explanations and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure. Together with the description, the drawings serve to explain the principle of the disclosure. In the drawings:

FIG. 3 is a view showing information stored in the charging service server shown in FIG. 2;

FIGS. 4 and 5 are views showing a charging service solution list;

FIGS. 7 and 8 are views showing a charging service solution list according to an embodiment of the present disclosure;

DETAILED DESCRIPTION OF THE DISCLOSURE

Figure 1:
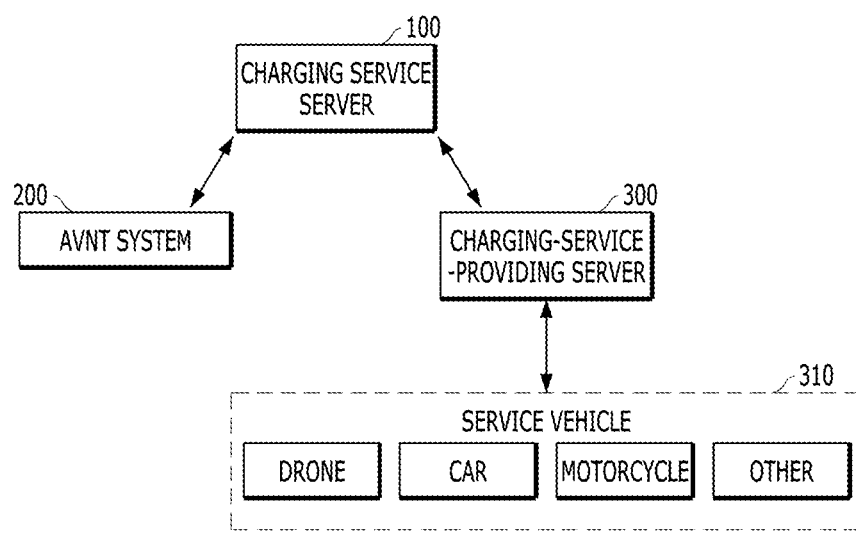
FIG. 1 is a block diagram showing a charging service system for a vehicle according to an embodiment of the present disclosure.

Hereinafter, embodiments of the present disclosure are described in detail with reference to the accompanying drawings so that those of ordinary skill in the art may easily carry out the embodiments. The present disclosure may, however, be embodied in many different forms and should not be construed as being limited to the embodiments set forth herein. In the drawings, some parts not related to the description of the present embodiments have been omitted for clarity. Like reference numerals refer to like elements throughout the specification and drawings.

Throughout the specification, unless explicitly described to the contrary, the word "include" and variations such as "includes" or "including" should be understood to imply the inclusion of stated elements but not the exclusion of any other elements. In addition, the terms "-er", "-or" and "module" used in the specification mean units for processing at least one function or operation and may be implemented using hardware components or software components and combinations thereof.

In addition, the same reference numerals used throughout the specification refer to the same constituent elements.

Hereinafter, a charging service system for a vehicle, a method of providing a charging service, and a vehicle using the same, which are applicable to embodiments of the present disclosure, are described in detail with reference to FIGS. 1-10.

FIG. 1 is a block diagram showing a charging service system for a vehicle according to an embodiment of the present disclosure.

As shown in FIG. 1, a charging service system for a vehicle according to the present disclosure includes a charging service server 100, which generates and provides a charging service solution list corresponding to the vehicle that requires charging. The charging service system further includes an audio/video/navigation/telematics (AVNT) system 200 of a vehicle. The AVNT system 200 is connected to the charging service server 100 and displays the charging service solution list. The charging service system also includes a charging-service-providing server 300, which is connected to the charging service server 100 and provides a charging service corresponding to the vehicle that requires charging.

The charging service server 100 may generate a charging service solution list corresponding to a vehicle that requires charging. The charging service server 100 may transmit the charging service solution list to the AVNT system 200 of the vehicle and may receive one solution item selected from the charging service solution list from the AVNT system 200 of the vehicle. The charging service server 100 may transmit a charging service request corresponding to the selected solution item to the charging-service-providing server 300 and may transmit charging service progress information of the charging-service-providing server 300 to the AVNT system 200 of the vehicle.

When generating the charging service solution list corresponding to the vehicle that requires charging, the charging service server 100 may receive vehicle information from the AVNT system 200 of the vehicle, may receive charging service provider information from the charging-service-providing server 300, and may generate the charging service solution list based on the received vehicle information and the received charging service provider information.

For example, when receiving the vehicle information from the AVNT system 200 of the vehicle, the charging service server 100 may receive vehicle information including at least one of the type of the vehicle, information about fuel used for the vehicle, current location information, travel route information, destination information, travelable distance information, or information about electronic components that are depleting fuel.

Upon receiving the vehicle information, the charging service server 100 may store the received vehicle information in real time.

Further, when receiving the charging service provider information, the charging service server 100 may receive a database of the charging service provider, point-of-interest (POI) information of the navigation system of the customer's vehicle, and charging service provider information collected from a content provider (CP). However, the present disclosure is not limited thereto.

For example, when receiving the charging service provider information from the charging-service-providing server 300, the charging service server 100 may receive the charging service provider information including at least one of charging station location information, currently available charging station information, current charging station use status information, charging station operating hours information, expected wait time information, emergency service waiting status information, or information about the type of fuel.

For example, the emergency service waiting status information may include chargeable fuel information in accordance with the use of a drone, a car, or a motorcycle, available service distance information, loading capacity information, arrival time information, and service cost information. However, the present disclosure is not limited thereto.

Upon receiving the charging service provider information, the charging service server 100 may store the received charging service provider information in real time.

When generating the charging service solution list corresponding to the vehicle that requires charging, the charging service server 100 may receive vehicle information from the AVNT system 200 of the vehicle and may determine whether the vehicle requires charging based on the received vehicle information. Upon determining that the vehicle corresponding to the received vehicle information requires charging, the charging service server 100 may generate a charging service solution list corresponding to the vehicle that requires charging.

For example, when determining whether the vehicle requires charging based on the received vehicle information, upon receiving the vehicle information from the customer's vehicle, the charging service server 100 may store the vehicle information in real time and may automatically determine whether the vehicle requires charging based on the stored vehicle information.

Alternatively, when determining whether the vehicle requires charging based on the received vehicle information, upon receiving a charging request signal from the customer's vehicle, the charging service server 100 may determine whether the vehicle requires charging based on the charging request signal.

When generating the charging service solution list, upon determining that the customer's vehicle requires charging, the charging service server 100 may generate a charging service solution list based on the prestored vehicle information and the charging service provider information.

The vehicle information may include at least one of the type of the vehicle, information about fuel used for the vehicle, current location information, travel route information, destination information, travelable distance information, or information about electronic components that are depleting fuel. However, the present disclosure is not limited thereto.

The charging service provider information may include at least one of charging station location information, currently available charging station information, current charging station use status information, charging station operating hours information, expected wait time information, emergency service waiting status information, or information about the type of fuel. However, the present disclosure is not limited thereto.

The emergency service waiting status information may include chargeable fuel information in accordance with the use of a drone, a car, or a motorcycle, available service distance information, loading capacity information, arrival time information, and service cost information. However, the present disclosure is not limited thereto.

When generating the charging service solution list, the charging service server 100 may generate a charging service solution list including the type of charging service, charging service availability, charging service use status, an arrival distance, an expected arrival time, and a service cost. However, the present disclosure is not limited thereto.

Further, when generating the charging service solution list, the charging service server 100 may determine a distance range around the vehicle that requires charging. The charging service server 100 may also generate a charging service solution list based on information about charging service providers that are located within the determined distance range around the vehicle that requires charging.

When determining the distance range around the vehicle that requires charging, the charging service server 100 may determine a distance range around the vehicle that requires charging based on a set value received from the customer, a travelable distance of the vehicle, and a default value.

When transmitting the charging service solution list to the AVNT system of the vehicle, the charging service server 100 may generate a charging service solution list including a full list, which includes both an unavailable charging service and an available charging service. The charging service server 100 may also transmit the charging service solution list to the AVNT system 200 of the vehicle.

In some cases, when transmitting the charging service solution list to the AVNT system of the vehicle, the charging service server 100 may generate a full list, which includes both an unavailable charging service and an available charging service. The charging service server 100 may also generate a list for the customer, which includes only the available charging service and excludes the unavailable charging service based on the generated full list. The charging service server 100 may further transmit the charging service solution list including the list for the customer to the AVNT system 200 of the vehicle.

Further, when transmitting the charging service solution list to the AVNT system 200 of the vehicle, the charging service server 100 may select an optimum solution item from the charging service solution list and may transmit the charging service solution list, in which the selected optimum solution item is distinguished from other solution items, to the AVNT system 200 of the vehicle.

For example, the charging service server 100 may highlight the selected optimum solution item such that the selected optimum solution item is distinguished from the other solution items. The charging service server 100 may also transmit the charging service solution list including the highlighted optimum solution item to the AVNT system 200 of the vehicle.

When selecting the optimum solution item, the charging service server 100 may select an optimum solution item according to a preset reference.

For example, the preset reference may be set based on at least one of the type of charging service, charging service availability, charging service use status, an arrival distance, an expected arrival time, or a service cost. However, the present disclosure is not limited thereto.

Alternatively, the preset reference may be set in advance by the user or may be set in advance as a default reference.

When transmitting the charging service progress information of the charging-service-providing server 300 to the AVNT system 200 of the vehicle, the charging service server 100 may transmit charging service progress information to the AVNT system 200 of the vehicle. The charging service progress information includes information regarding whether a service vehicle has departed, an expected arrival time, and the current location of the service vehicle.

When connected to the charging service server 100, the AVNT system 200 of the vehicle may transmit vehicle information to the charging service server 100 in real time.

For example, the vehicle information may include at least one of the type of the vehicle, information about fuel used for the vehicle, current location information, travel route information, destination information, travelable distance information, or information about electronic components that are depleting fuel.

Upon receiving the charging service solution list from the charging service server 100, the AVNT system 200 of the vehicle may display the received charging service solution list. When one solution item is selected from the displayed charging service solution list, the AVNT system 200 may transmit the selected solution item to the charging service server 100.

Upon receiving the charging service progress information from the charging service server 100, the AVNT system 200 of the vehicle may display charging service progress information including information regarding whether a service vehicle has departed, an expected arrival time, and the current location of the service vehicle.

When connected to the charging service server 100, the charging-service-providing server 300 may transmit the charging service provider information to the charging service server 100 in real time.

The charging-service-providing server 300 may provide a charging service corresponding to the vehicle that requires charging through a service vehicle 310, which includes a drone, a car, a motorcycle, and other means of transportation.

The operation of the present disclosure constructed as described above is described briefly below.

The AVNT system 200 of the present disclosure may transmit state of charge (SoC) information of a battery to a telematics center, including the charging service server 100, in real time.

The telematics center may receive all vehicle information and may build a database (DB) of the vehicle information in real time.

For example, the vehicle information may include the type of the vehicle, the type of fuel, the current location of the vehicle, a travel route, a destination, and a travelable distance. However, the present disclosure is not limited thereto.

The telematics center may acquire a database of the charging station, point-of-interest (POI) information of the navigation system, or charging station information from a content provider (CP).

In other words, the telematics center may collect charging station information, such as the location of the charging station, charging service availability (unavailable or available), charging service use status (busy/normal/smooth), and an expected wait time.

In addition, the telematics center may acquire information about a drone, a car, an express (motorcycle) delivery service, and the like, which may be urgently dispatched by a charging station or a public office.

In other words, the telematics center may acquire drone information, car information, express (motorcycle) delivery service information, and the like from the place, such as the charging station or public office, that provides an emergency charging service.

For example, the drone information may include chargeable fuel, an available service distance (range) of the drone, a loading capacity, an arrival time (which may be calculated by the telematics center based on "moving distance of drone/speed of drone"), and an expense for a corresponding service (which may be calculated by the telematics center based on an estimation standard).

Since the car information and the express delivery service information are the same as the drone information, a description thereof has been omitted.

As such, the telematics center may acquire real-time vehicle information and charging station information and may build a database (DB) of the above information for an emergency charging service.

Subsequently, the telematics center may determine whether it is possible for the customer's vehicle to reach an adjacent charging station with the current state of charge (SoC) of the battery of the vehicle based on the vehicle DB and the charging station DB.

In some cases, the AVNT system 200 may determine the above situation and may transmit the determination result to the telematics center.

In other cases, when receiving an emergency charging service request from a customer, the telematics center may determine a method of urgently charging the vehicle that requires charging from the charging station DB based on the information of the corresponding vehicle.

Subsequently, based on the information of the vehicle that requires charging, the telematics center may generate the location of a charging station (the shortest distance from the corresponding vehicle) that is capable of providing an emergency charging service to the corresponding vehicle. The telematics center may also generate the status of the charging station (availability, use status, and an expected wait time) and a countermeasure for each dispatch method from the charging station DB.

For example, in the case of drone dispatch, the telematics center may extract information including availability, an expected time of arrival at the customer, a charging method (e.g., direct charging, simple delivery of a battery pack, and the like), and a service cost.

In the case of car dispatch, the telematics center may extract information including availability (if unavailable, an expected available time), the current location of the dispatched car, an expected time of arrival at the customer, a charging method, and a service cost.

The location of the dispatched car and the expected time of arrival to the customer location may be calculated based on the information obtained from the charging station DB and the current traffic information obtained from the telematics center.

In the case of an express delivery service, the telematics center may extract information including availability, an expected time of arrival at the customer, a charging method (e.g., direct charging, simple delivery of a battery pack, and the like), and a service cost.

The telematics center may not only determine whether it is possible for the customer's vehicle to reach an adjacent charging station with the current state of charge (SoC) of the battery/fuel of the vehicle, but the telematics center may also proactively monitor the customer's vehicle on the basis of a preset distance (e.g., 50 km (about 31 miles) or less) within which the customer's vehicle is capable of reaching the nearest charging station.

The telematics center may build a list of various countermeasures and may transmit the list to the AVNT system 200.

At this time, the telematics center may build a database of countermeasures that are possible to perform, countermeasures that are difficult to perform, and countermeasures that are impossible to perform. The telematics center may separately transmit only the service list that the customer selects to the AVNT system 200.

For example, the telematics center may build a database (DB) of available charging service data collected from a charging station, a public office or a CP, which includes the charging-service-providing server 300.

The telematics center may make a full list of information about available emergency charging service items near the vehicle that requires charging service, may make a list of service items that are available to the customer from the full list, and may transmit the list of the available service items to the AVNT system 200.

The meaning of "near" may be defined as a value set by the customer through the AVNT system 200, a travelable distance, or a default value.

In addition, the telematics center may select an optimum solution from the list for the customer.

If the customer sets restrictions related to the optimum solution through the AVNT system 200, the optimum solution may be selected on the basis of the set restrictions.

For example, the restrictions may be set such that an optimum solution that is free of charge is selected.

The AVNT system 200 may transmit the service selected by the customer to the telematics center including the charging service server 100.

The telematics center may transmit an emergency charging service order corresponding to the selected service to the management section including the charging-service-providing server 300 so that the service is carried out.

In addition, the telematics center may determine the progress status of the management section (such as departure, real-time update of an expected arrival time, the current location of the management section, and the like) and may transmit the determination result to the AVNT system 200.

The AVNT system 200 may display an emergency service progress status on a monitor.

As described above, the present disclosure provides a charging service corresponding to a charging service solution list and a solution item selected from the charging service solution list to the customer's vehicle that requires charging, thereby providing an optimum charging service according to the situation of the customer's vehicle.

In addition, the present disclosure provides charging service progress information to the customer's vehicle that requires charging, thereby providing convenience in use.

In other words, the present disclosure provides a charging service more actively than a conventional service requested by a customer or a conventional emergency road service. According to the present disclosure, the AVNT system and the telematics center that have the charging service server, build a database of information about the customer's vehicle and a database of the real-time status of a charging station, and monitor the possibility of occurrence of fuel depletion of the vehicle in order to provide an optimum service to the customer before or immediately after the occurrence of fuel depletion of the vehicle, thereby improving convenience in use and marketability.

First, the situations of a customer, a vehicle and a charging station are determined in various ways (using SoC information, vehicle information, gas station information, charging car information, drone information, and the like). Second, information about various emergency charging methods is provided to the customer through an AVN monitor. Third, the optimum solution among the emergency charging methods that is the most suitable for the customer's situation is proposed, or the customer is prompted to select a desired one among the emergency charging methods. As a result, it is possible to provide an optimum emergency charging service to the customer.

Figure 2:
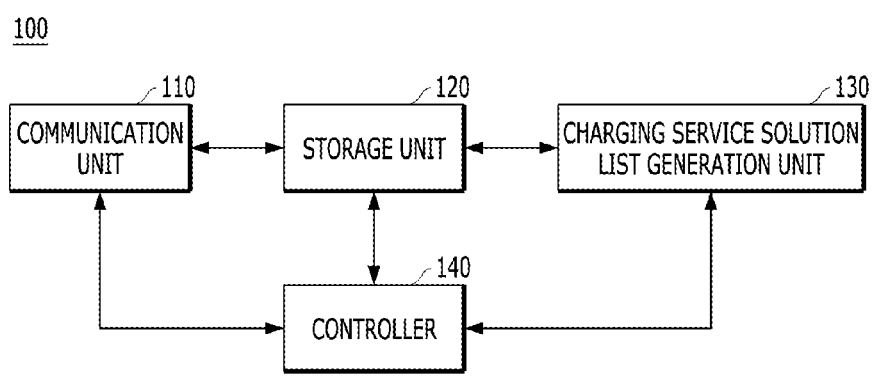
FIG. 2 is a block diagram showing the charging service server shown in FIG. 1.

FIG. 2 is a block diagram showing the charging service server shown in FIG. 1.

As shown in FIG. 2, the charging service server 100: may include a communication unit 110, which receives vehicle information and charging service provider information; a storage unit 120, which stores the vehicle information and the charging service provider information; a charging service solution list generation unit 130, which generates a charging service solution list based on the vehicle information and the charging service provider information; and a controller 140, which controls the communication unit 110, the storage unit 120 and the charging service solution list generation unit 130.

The controller 140 may determine a vehicle that requires charging based on the vehicle information. The controller 140 may further control the charging service solution list generation unit 130 to generate a charging service solution list corresponding to the vehicle that requires charging. The controller 140 may also transmit the generated charging service solution list to the AVNT system of the vehicle that requires charging. The controller 140 may further transmit, when one solution item is selected from the charging service solution list from the AVNT system of the vehicle that requires charging, a charging service request corresponding to the selected solution item to the charging-service-providing server. The controller 140 may also transmit charging service progress information of the charging-service-providing server to the AVNT system of the vehicle that requires charging.

The charging service solution list generation unit 130 may generate a charging service solution list based on the vehicle information received from the AVNT system of the vehicle and the charging service provider information received from the charging-service-providing server.

For example, the vehicle information may include at least one of the type of the vehicle, information about fuel used for the vehicle, current location information, travel route information, destination information, travelable distance information, or information about electronic components that are depleting fuel.

The charging service provider information may include at least one of charging station location information, currently available charging station information, current charging station use status information, charging station operating hours information, expected wait time information, emergency service waiting status information, or information about the type of fuel.

The emergency service waiting status information may include chargeable fuel information in accordance with the use of a drone, a car, or a motorcycle, available service distance information, loading capacity information, arrival time information, and service cost information. However, the present disclosure is not limited thereto.

Subsequently, the charging service solution list generation unit 130 may generate a charging service solution list including the type of charging service, charging service availability, charging service use status, an arrival distance, an expected arrival time, and a service cost. However, the present disclosure is not limited thereto.

Subsequently, the charging service solution list generation unit 130 may determine a distance range around the vehicle that requires charging. The charging service solution list generation unit 130 may also generate a charging service solution list based on information about charging service providers that are located within the determined distance range around the vehicle that requires charging.

When determining the distance range around the vehicle that requires charging, the charging service solution list generation unit 130 may determine a distance range around the vehicle that requires charging based on a set value received from the customer, a travelable distance of the vehicle, and a default value.

The controller 140 may determine whether the vehicle requires charging based on the received vehicle information. Upon determining that the vehicle corresponding to the received vehicle information requires charging, the controller 140 may control the charging service solution list generation unit 130 so as to generate a charging service solution list corresponding to the vehicle that requires charging.

For example, when determining whether the vehicle requires charging based on the received vehicle information, upon receiving the vehicle information from the customer's vehicle, the controller 140 may store the vehicle information in real time. The controller 140 may also automatically determine whether the vehicle requires charging based on the stored vehicle information.

Alternatively, when determining whether the vehicle requires charging based on the received vehicle information, upon receiving a charging request signal from the customer's vehicle, the controller 140 may determine whether the vehicle requires charging based on the charging request signal.

The controller 140 may transmit a charging service solution list including a full list, which includes both an unavailable charging service and an available charging service to the AVNT system of the vehicle.

In some cases, the controller 140 may transmit a list for the customer to the AVNT system of the vehicle. The list for the customer includes only the available charging service and excludes the unavailable charging service based on the full list that includes both the unavailable charging service and the available charging service.

Further, the controller 140 may select an optimum solution item from the charging service solution list. The controller 140 may also transmit the charging service solution list, in which the selected optimum solution item is distinguished from other solution items, to the AVNT system of the vehicle.

When selecting the optimum solution item, the controller 140 may select an optimum solution item according to a preset reference.

For example, the preset reference may be set based on at least one of the type of charging service, charging service availability, charging service use status, an arrival distance, an expected arrival time, or a service cost. However, the present disclosure is not limited thereto.

Alternatively, the preset reference may be set in advance by the user or may be set in advance as a default reference.

When transmitting the charging service progress information of the charging-service-providing server to the AVNT system of the vehicle, the controller 140 may transmit charging service progress information to the AVNT system of the vehicle. The charging service progress information may include information regarding whether a service vehicle has departed, an expected arrival time, and the current location of the service vehicle.

FIG. 3 is a view showing information stored in the charging service server shown in FIG. 2.

As shown in FIG. 3, the charging service server may receive the vehicle information from the AVNT system of the vehicle. The vehicle information may include at least one of the type of the vehicle, information about fuel used for the vehicle, current location information, travel route information, destination information, travelable distance information, or information about electronic components that are depleting fuel.

Upon receiving the vehicle information, the charging service server may build a database of the received vehicle information and may store the database in a first storage unit 122 in real time.

Further, the charging service server may receive a database of the charging service provider, point-of-interest (POI) information of the navigation system of the customer's vehicle, and charging service provider information collected from a content provider (CP).

For example, the charging service server may receive the charging service provider information from the charging-service-providing server. The charging service provider information may include at least one of charging station location information, currently available charging station information, current charging station use status information, charging station operating hours information, expected wait time information, emergency service waiting status information, or information about the type of fuel.

For example, the emergency service waiting status information may include chargeable fuel information in accordance with the use of a drone, a car, or a motorcycle, available service distance information, loading capacity information, arrival time information, and service cost information. However, the present disclosure is not limited thereto.

Upon receiving the charging service provider information, the charging service server may build a database of the received charging service provider information and may store the database in a second storage unit 124 in real time.

FIGS. 4 and 5 are views showing a charging service solution list.

As shown in FIGS. 4 and 5, the charging service server may generate a charging service solution list 400, which includes the type of charging service, charging service availability, charging service use status, an arrival distance, an expected arrival time, and a service cost. However, the present disclosure is not limited thereto.

The charging service server, as shown in FIG. 4, may generate the charging service solution list 400 including a full list, which includes both an unavailable charging service 430 and an available charging service 410 and 420. The charging service server may also transmit the charging service solution list 400 to the AVNT system of the vehicle.

In some cases, as shown in FIG. 5, the charging service server may generate a full list, which includes both an unavailable charging service and an available charging service. The charging service server may further generate a list for the customer, which includes only the available charging service and excludes the unavailable charging service based on the generated full list. The charging service server may also transmit the charging service solution list 400 including the list for the customer to the AVNT system of the vehicle.

Further, as shown in FIG. 5, the charging service server may select an optimum solution item 440 from the charging service solution list 400. The charging service server may also transmit the charging service solution list 400, in which the selected optimum solution item 440 is distinguished from other solution items, to the AVNT system of the vehicle.

For example, the charging service server may highlight the selected optimum solution item 440 such that the selected optimum solution item 440 is distinguished from the other solution items. The charging service server may also transmit the charging service solution list 400 including the highlighted optimum solution item 440 to the AVNT system of the vehicle.

The charging service server may select the optimum solution item 440 according to a preset reference.

For example, the preset reference may be set based on at least one of the type of charging service, charging service availability, charging service use status, an arrival distance, an expected arrival time, or a service cost. However, the present disclosure is not limited thereto.

Alternatively, the preset reference may be set in advance by the user or may be set in advance as a default reference.

Figure 6:
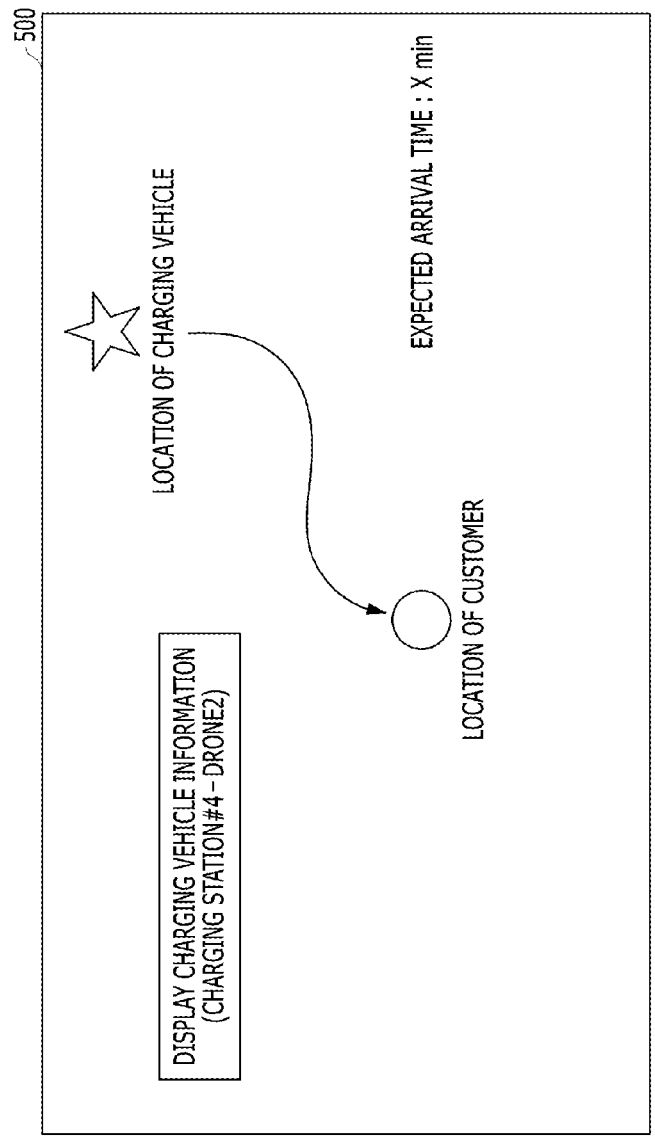
FIG. 6 is a view showing a screen of an AVNT system that displays charging service progress information.

FIG. 6 is a view showing the screen of the AVNT system that displays charging service progress information.

As shown in FIG. 6, the charging service server may transmit charging service progress information to the AVNT system of the vehicle. The charging service progress information may include information regarding whether a service vehicle has departed, an expected arrival time, and the current location of the service vehicle.

Upon receiving the charging service progress information 500 from the charging service server, the AVNT system of the vehicle may display the charging service progress information 500. The charging service progress information 500 may include information regarding whether a service vehicle has departed, an expected arrival time, and the current location of the service vehicle.

FIGS. 7 and 8 are views showing a charging service solution list according to the embodiment.

As shown in FIGS. 7 and 8, one embodiment is described based on several assumptions. One assumption is that the vehicle that requires charging is located at Giseong Mang-yang Beach and that the travelable distance thereof is about 30 km (about 18.5 miles) (e.g., an SoC of 5 km (about 3.1 miles)). Another assumption is that Huenest Charging Station, which is test-operated and does not provide a direct charging service (however, only dispatch of a drone performing partial charging is available), is located about 27 km (about 16.75 miles) from the vehicle that requires charging. Another assumption is that Yangyang-gun Office Charging Station is located about 73 km (about 45.3 miles) from the vehicle that requires charging and thus it is impossible for the vehicle that requires charging to get to the same. Another assumption is that Uljin Airport provides a charging vehicle dispatch service (however, only dispatch of a charging car performing quick and partial charging is available). Another assumption is that public office A provides a charging vehicle dispatch service (however, only dispatch of a drone performing quick and partial charging is available).

The charging service server of the present disclosure collects vehicle information (such as the location of the vehicle, an SoC, a travelable distance, and the like) from the vehicle that requires charging and charging station status information (such as charging station availability, a wait time, an available charging vehicle, an expected arrival time of the charging vehicle, a service cost, and the like) from an available charging station or public office that is located near the vehicle that requires charging.

The charging service server, as shown in FIG. 7, builds a database of a countermeasure list for an emergency charging service from the above information and generates the charging service solution list 400.

Subsequently, the charging service server may extract a list for the customer, which includes only the available charging service and excludes the unavailable charging service, from the full list including both the unavailable charging service and the available charging service. The charging service server may further transmit the list for the customer to the AVNT system of the vehicle.

The charging service server may highlight the selected optimum solution item 440 such that the selected optimum solution item 440 is distinguished from the other solution items. The charging service server may also transmit the charging service solution list 400 including the highlighted optimum solution item 440 to the AVNT system of the vehicle.

Figure 9:
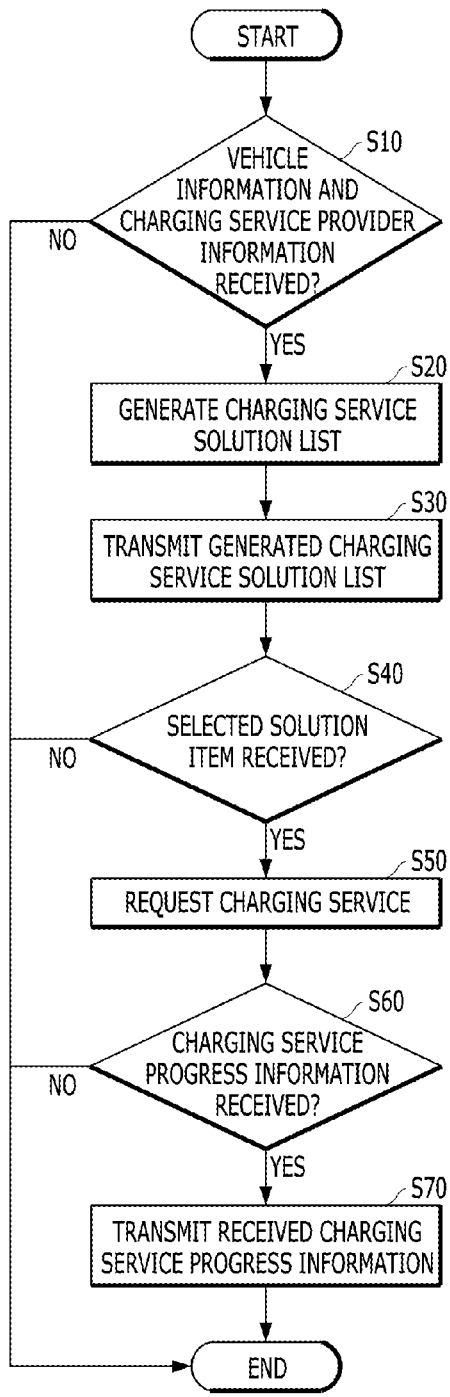
FIG. 9 is a flowchart showing a method of providing a charging service of the charging service system for a vehicle according to an embodiment of the present disclosure.

FIG. 9 is a flowchart showing a method of providing a charging service of the charging service system for a vehicle according to an embodiment of the present disclosure.

As shown in FIG. 9, the charging service server determines whether vehicle information is received from the AVNT system of the vehicle and whether charging service provider information is received from the charging-service-providing server (S10).

The charging service server may receive the vehicle information including at least one of the type of the vehicle, information about fuel used for the vehicle, current location information, travel route information, destination information, travelable distance information, or information about electronic components that are depleting fuel.

Further, the charging service server may receive the charging service provider information including at least one of charging station location information, currently available charging station information, current charging station use status information, charging station operating hours information, expected wait time information, emergency service waiting status information, or information about the type of fuel.

The emergency service waiting status information may include chargeable fuel information in accordance with the use of a drone, a car, or a motorcycle, available service distance information, loading capacity information, arrival time information, and service cost information.

Upon receiving the vehicle information and the charging service provider information, the charging service server generates a charging service solution list based on the received vehicle information and charging service provider information (S20).

When the charging service server generates the charging service solution list, the method may include a step of receiving vehicle information from the AVNT system of the vehicle. The method may further include a step of determining whether the vehicle requires charging based on the received vehicle information. The method may also include a step of, upon determining that the vehicle corresponding to the received vehicle information requires charging, generating a charging service solution list corresponding to the vehicle that requires charging.

Subsequently, the charging service server transmits the generated charging service solution list to the AVNT system of the vehicle (S30).

The charging service server may transmit a charging service solution list including a full list to the AVNT system of the vehicle. The full list includes both an unavailable charging service and an available charging service.

In some cases, the charging service server may transmit a list for the customer to the AVNT system of the vehicle. The list for the customer includes only the available charging service and excludes the unavailable charging service based on the full list including both the unavailable charging service and the available charging service.

Alternatively, the charging service server may select an optimum solution item from the charging service solution list. The charging service server may also transmit the charging service solution list, in which the selected optimum solution item is distinguished from other solution items, to the AVNT system of the vehicle.

Subsequently, the charging service server determines whether one solution item selected from the charging service solution list is received from the AVNT system of the vehicle (S40).

Upon receiving the selected solution item, the charging service server may transmit a charging service request corresponding to the selected solution item to the charging-service-providing server (S50).

Subsequently, the charging service server determines whether charging service progress information is received from the charging-service-providing server (S60).

Subsequently, upon receiving the charging service progress information, the charging service server transmits the received charging service progress information to the AVNT system of the vehicle (S70).

The charging service server may transmit charging service progress information to the AVNT system of the vehicle. The charging service progress information may include information regarding whether a service vehicle has departed, an expected arrival time, and the current location of the service vehicle.

Figure 10:
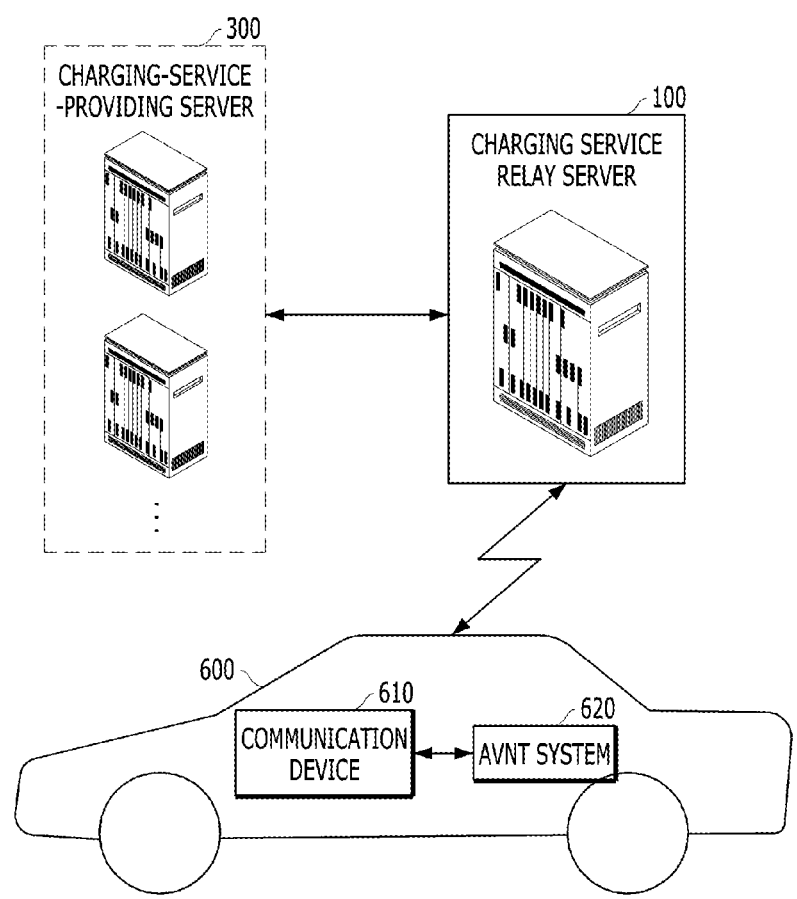
FIG. 10 is a view showing a vehicle that uses the charging service system for a vehicle according to an embodiment of the present disclosure.

FIG. 10 is a view showing a vehicle that uses the charging service system for the vehicle according to an embodiment of the present disclosure.

As shown in FIG. 10, a vehicle 600 uses the charging service system for the vehicle, which includes the charging service server 100 connected to an AVNT system 620 and to the charging-service-providing server 300. The vehicle 600 may include a communication device 610, which is connected to the charging service server 100, and the AVNT system 620, which displays the charging service solution list and the charging service progress information received from the charging service server 100.

Upon receiving the charging service solution list from the charging service server 100, the AVNT system 620 may display the received charging service solution list. When one solution item is selected from the displayed charging service solution list, the AVNT system 620 may transmit the selected solution item to the charging service server 100. Upon receiving the charging service progress information corresponding to the selected solution item from the charging service server 100, the AVNT system 620 may display the received charging service progress information.

According to the present disclosure, a computer-readable recording medium having recorded thereon a program for executing a method of providing a charging service of a charging service system for a vehicle may perform operations provided in the method of providing a charging service of a charging service system for the vehicle according to an embodiment of the present disclosure.

As is apparent from the above description, a charging service system for a vehicle, a method of providing a charging service, and a vehicle using the same according to at least one embodiment of the present disclosure configured as described above, may provide a charging service solution list and a charging service corresponding to a solution item selected from the charging service solution list to a customer's vehicle that requires charging. Thereby, an optimum charging service according to the situation of the customer's vehicle may be provided.

In addition, the present disclosure may provide charging service progress information to a customer's vehicle that requires charging, thereby providing convenience in use.

In other words, the present disclosure provides a charging service more actively than a conventional service requested by a customer or a conventional emergency road service. According to the present disclosure, an AVNT system and a telematics center, which have a charging service server, build a database of information about the customer's vehicle and a database of the real-time status of a charging station. The AVNT system and telematics center also monitor the possibility of occurrence of fuel depletion of the vehicle in order to provide an optimum service to the customer before or immediately after the occurrence of fuel depletion of the vehicle. Thereby, convenience in use and marketability is improved.

First, the situations of a customer, a vehicle and a charging station are determined in various ways (using SoC information, vehicle information, gas station information, charging car information, drone information, and the like). Second, information about various emergency charging methods is provided to the customer through an AVN monitor. Third, the optimum solution among the emergency charging methods that is the most suitable for the customer's situation is proposed, or the customer is prompted to select a desired one among the emergency charging methods. As a result, it is possible to provide an optimum emergency charging service to the customer.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid-state disk (SSD), a silicon disk drive (SDD), ROM, RAM, a CD-ROM, a magnetic tape, a floppy disk, and an optical data storage device.

It should be appreciated by those having ordinary skill in the art that the effects achievable through the present embodiments are not limited to those that have been specifically described hereinabove. Other effects of the present disclosure can be more clearly understood from the above detailed description.

The above detailed description is not to be construed as limiting the present disclosure in any aspect and is to be considered by way of example. The scope of the present disclosure should be determined by reasonable interpretation of the accompanying claims. All equivalent modifications made without departing from the present disclosure should be understood to be included in the scope of the following claims.

What is claimed is:

1. A charging service system for a vehicle, the charging service system comprising:

a charging service server configured to generate and provide a charging service solution list corresponding to a vehicle that requires charging;

an audio/video/navigation/telematics (AVNT) system of a vehicle connected to the charging service server, the AVNT system displaying the charging service solution list; and a charging-service-providing server connected to the charging service server, the charging-service-providing server providing a charging service corresponding to the vehicle that requires charging, wherein the charging service server generates a charging service solution list corresponding to the vehicle that requires charging, transmits the charging service solution list to the AVNT system of the vehicle, receives one solution item selected from the charging service solution list from the AVNT system of the vehicle, transmits a charging service request corresponding to the selected solution item to the charging-service-providing server, and transmits charging service progress information of the charging-service-providing server to the AVNT system of the vehicle.

2. The charging service system according to claim 1, wherein, when generating the charging service solution list corresponding to the vehicle that requires charging, the charging service server receives vehicle information from the AVNT system of the vehicle, receives charging service provider information from the charging-service-providing server, and generates the charging service solution list based on the received vehicle information and the received charging service provider information.

3. The charging service system according to claim 2, wherein, when receiving vehicle information from the AVNT system of the vehicle, the charging service server receives vehicle information comprising at least one of a type of the vehicle, information about fuel used for the vehicle, current location information, travel route information, destination information, travelable distance information, or information about electronic components that are depleting fuel.

4. The charging service system according to claim 2, wherein, when receiving charging service provider information from the charging-service-providing server, the charging service server receives the charging service provider information comprising at least one of: charging station location information, currently available charging station information, current charging station use status information, charging station operating hours information, expected wait time information, emergency service waiting status information, or information about a type of fuel.

5. The charging service system according to claim 4, wherein the emergency service waiting status information comprises chargeable fuel information in accordance with use of a drone, a car and a motorcycle, available service distance information, loading capacity information, arrival time information, and service cost information.

6. The charging service system according to claim 1, wherein, when generating a charging service solution list corresponding to the vehicle that requires charging, the charging service server receives vehicle information from the AVNT system of the vehicle, determines whether the vehicle requires charging based on the received vehicle information, and, upon determining that the vehicle corresponding to the received vehicle information requires charging, generates a charging service solution list corresponding to the vehicle that requires charging.

7. The charging service system according to claim 6, wherein, when determining whether the vehicle requires charging based on the received vehicle information, upon receiving the vehicle information, the charging service server stores the vehicle information in real time, and automatically determines whether the vehicle requires charging based on the stored vehicle information.

8. The charging service system according to claim 6, wherein, when determining whether the vehicle requires charging based on the received vehicle information, upon receiving a charging request signal from the vehicle, the charging service server determines whether the vehicle requires charging based on the charging request signal.

9. The charging service system according to claim 1, wherein, when generating the charging service solution list, upon determining that the vehicle requires charging, the charging service server generates a charging service solution list based on prestored vehicle information and charging service provider information.

10. The charging service system according to claim 1, wherein, when generating the charging service solution list, the charging service server generates a charging service solution list comprising a type of: charging service, charging service availability, charging service use status, an arrival distance, an expected arrival time, and a service cost.

11. The charging service system according to claim 1, wherein, when transmitting the charging service solution list to the AVNT system of the vehicle, the charging service server generates a charging service solution list comprising a full list, which comprises both an unavailable charging service and an available charging service, and transmits the charging service solution list to the AVNT system of the vehicle.

12. The charging service system according to claim 1, wherein, when transmitting the charging service solution list to the AVNT system of the vehicle, the charging service server generates a full list, which comprises both an unavailable charging service and an available charging service, generates a list for a customer, which comprises the available charging service and excludes the unavailable charging service, based on the generated full list, and transmits a charging service solution list comprising the list for the customer to the AVNT system of the vehicle.

13. The charging service system according to claim 1, wherein, when transmitting the charging service solution list to the AVNT system of the vehicle, the charging service server selects an optimum solution item from the charging service solution list and transmits the charging service solution list, in which the selected optimum solution item is distinguished from other solution items, to the AVNT system of the vehicle.

14. The charging service system according to claim 13, wherein, when selecting the optimum solution item, the charging service server selects the optimum solution item according to a predetermined reference.

15. The charging service system according to claim 14, wherein the predetermined reference is set in advance by a user, or is set in advance as a default reference.

16. The charging service system according to claim 1, wherein, when transmitting charging service progress information of the charging-service-providing server to the AVNT system of the vehicle, the charging service server transmits charging service progress information comprising information regarding whether a service vehicle has departed, an expected arrival time, and a current location of the service vehicle, to the AVNT system of the vehicle.

17. The charging service system according to claim 1, wherein, when connected to the charging service server, the AVNT system of the vehicle transmits vehicle information to the charging service server in real time.

18. The charging service system according to claim 1, wherein, upon receiving the charging service solution list from the charging service server, the AVNT system of the vehicle displays the received charging service solution list, and when one solution item is selected from the displayed charging service solution list, transmits the selected solution item to the charging service server.

19. The charging service system according to claim 1, wherein, upon receiving the charging service progress information from the charging service server, the AVNT system of the vehicle displays charging service progress information comprising information regarding whether a service vehicle has departed, an expected arrival time, and a current location of the service vehicle.

* * * * *